United States Patent [19]

Kamiya et al.

[11] 4,406,119
[45] Sep. 27, 1983

[54] CARBON-PARTICLE DECONTAMINATING SYSTEM

[75] Inventors: Sigeru Kamiya, Chiryu; Masaei Nozawa, Kariya; Nobutoshi Hayashi, Nishio; Seiji Morino, Okazaki, all of Japan

[73] Assignee: Nippon Soken, Inc., Nishio, Japan

[21] Appl. No.: 302,393

[22] Filed: Sep. 15, 1981

[30] Foreign Application Priority Data

Nov. 21, 1980 [JP] Japan ................. 55-164812

[51] Int. Cl.³ ................................. F01N 3/02
[52] U.S. Cl. .................... 60/275; 55/124; 55/127; 55/282; 55/462; 55/466; 55/DIG. 10; 55/DIG. 30; 60/297; 60/303; 60/311
[58] Field of Search ............ 60/275, 311, 297, 303; 55/DIG. 30, DIG. 10, 124, 127, 282, 391, 447, 457, 462, 466

[56] References Cited

U.S. PATENT DOCUMENTS

| | | | |
|---|---|---|---|
| 2,114,682 | 4/1938 | Gumaer | 55/127 |
| 2,265,707 | 12/1941 | Wall | 55/462 |
| 2,639,780 | 5/1953 | Hardy | 55/DIG. 10 |
| 2,785,769 | 3/1957 | Pollock | 55/124 |
| 3,263,404 | 8/1966 | Krizman | 55/447 |
| 3,526,081 | 9/1970 | Kusters | 55/127 |
| 3,570,221 | 3/1971 | Oliver | 55/462 |
| 3,999,967 | 12/1976 | Aoi | 55/DIG. 30 |
| 4,222,859 | 9/1980 | Medlock | 55/277 |
| 4,319,896 | 3/1982 | Sweeney | 55/466 |
| 4,376,637 | 3/1983 | Yang | 60/275 |

FOREIGN PATENT DOCUMENTS

| | | | |
|---|---|---|---|
| 1029116 | 3/1953 | France | 55/124 |
| 570777 | 7/1945 | United Kingdom | 55/127 |
| 1022714 | 3/1966 | United Kingdom | 60/275 |

Primary Examiner—Douglas Hart
Attorney, Agent, or Firm—Cushman, Darby & Cushman

[57] ABSTRACT

Particle-laden exhaust gases flow through a first stage consisting of a filter cake so the particles of sizes of the order of microns are trapped over the surface of the filter cake and agglomerated or granulated and the agglomerated or granulated particles are entrained by the flow of exhaust gases into an inertia type particle collector or separator in which they are separated from the exhaust gases and the collected particles are burned out by an electric heating element.

5 Claims, 10 Drawing Figures

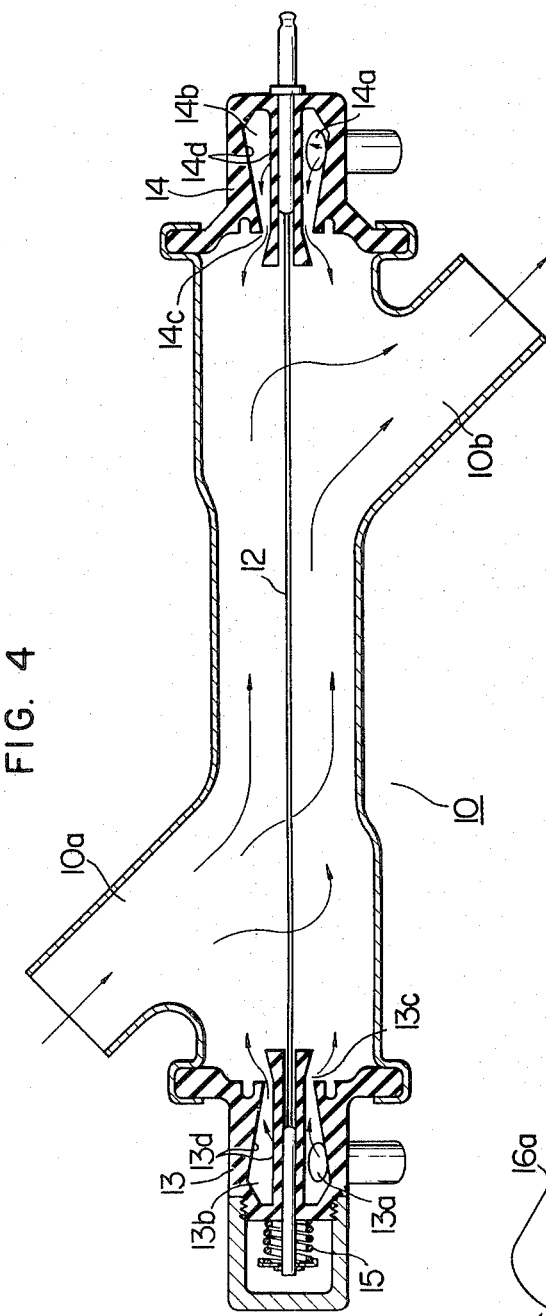
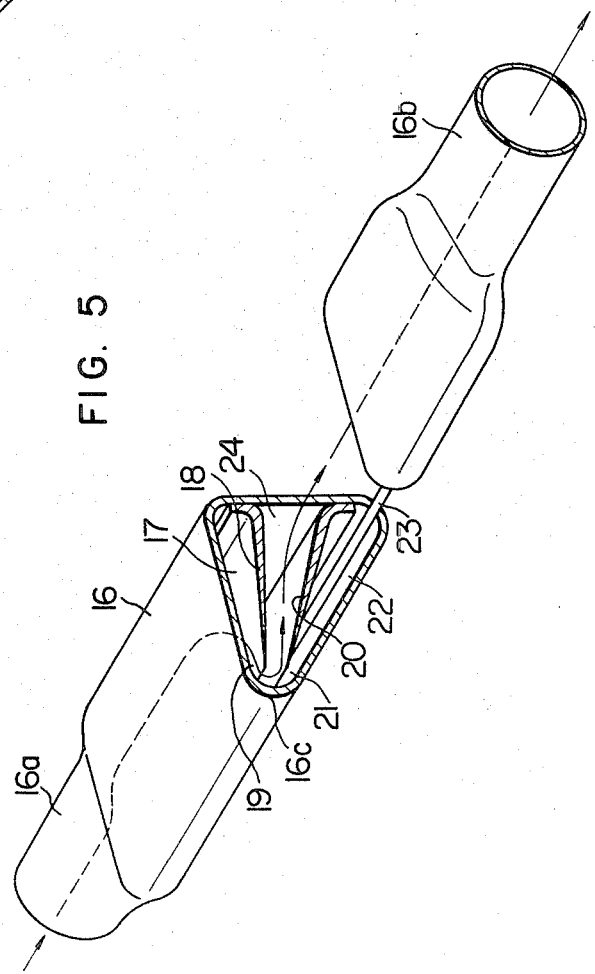

CARBON-PARTICLE DECONTAMINATING SYSTEM

BACKGROUND OF THE INVENTION

The present invention relates to a system for decontaminating or eliminating carbon particles carried in the exhaust gases from internal combustion engines and especially diesel engines.

There have been widely used carbon-particle decontaminating systems of the type in which the particles carried in the exhaust gases are trapped by filters. Since the particles trapped and accumulated over the surfaces of filters drop, the filters must be heated to temperatures in excess of about 600° C. by a suitable heating means at a suitable time interval so that the collected particles are burned out and consequently the filters are regenerated. The heating means is in general a burner which burns a fuel for internal combustion engines. However, the burner has some disadvantages. Firstly, it consumes a large amount of fuel; secondly, the use of the burner results in a system complex in construction; thirdly, the particles trapped and collected over the filters drop and are discharged together with the exhaust gases; and fourthly, since the filters are heated, they must be made heat-resisting materials.

SUMMARY OF THE INVENTION

The present invention is based on the observed fact that the particles trapped over the surface of a filter are agglomerated or granulated to the size of 0.1–1.0 mm when they dop from the filter and such agglomerated or granulated particles can be easily collected by inertia or impingement dust separators. Therefore, the present invention has for its object to provide a carbon-particle decontaminating system in which an inertia or impingement dust separator is disposed at the downstream of a filter cake so as to collect the particles dropped from the filter cake and the collected particles are burned out by an electric heating means, whereby the problems encountered in the prior art system can be overcomed.

According to one aspect of the present invention, in a first stage, the exhaust gases are made to flow through a filter cake so that the particles of sizes of microns are trapped over the surface of the filter cake. The particles which are agglomerated or granulated and drop from the filter cake are collected by an inertia or impingement dust separator and the collected particles are burned out by an electric heating means. Therefore, the present invention can eliminate the process of the prior art system for burning a large amount of fuel or consuming a large quantity of energy so as to heat the whole structure of a filter cake to thereby burn out the trapped particles. To put in another way, the present invention can decontaminate carbon particles carried in the exhaust gases by consuming less energy than the prior art system.

According to another aspect of the present invention, in an inertia or impingement dust separator the particle-laden exhaust gases are discharged through a slit-like nozzle in the form of a thin film and the film-like jet of exhaust gases is caused to abruptly change its directin of flow so that only the particles can be efficiently collected in a particle trap chamber. In addition, mountability on automotive vehicles can be considerably improved. Furthermore, the carbon-particle decontaminating system can be made compact in size.

The above and other objects, effects and featuers of the present invention will become more apparent from the following description of preferred embodiments thereof taken in conjunction with the accompanying drawings.

BRIEF DESCRIPTION OF THE DRAWINGS

FIG. 4 is a sectional view, on enlarged scale, of a particle charging section thereof;

FIG. 5 is a perspective view, partly in section, of a second example of a particle separator in accordance with the present invention;

Same reference numerals are used to designate similar parts throughout the figures.

DESCRIPTION OF THE PREFERRED EMBODIMENTS

Figure 1:
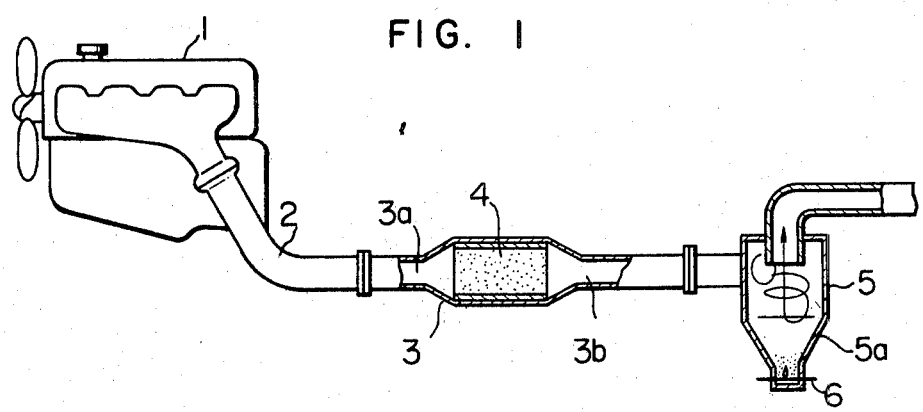
FIG. 1 is a side view, partly in section, of a first embodiment of the present invention.
Figure 2:
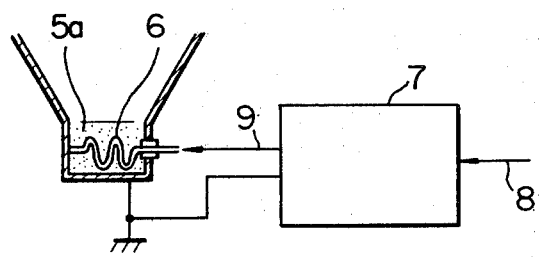
FIG. 2 is a fragmentary view, on enlarged scale, of a cyclone particle collector or separator shown in FIG. 1.

Referring to FIGS. 1 and 2 showing a first embodiment of the present invention, reference numeral 1 denotes an internal combustin engine such as a diesel engine; 2, an exhaust pipe; 3, a casing which encloses a filter cake 4 and has an exhaust-gas inlet 3a and an outlet 3b. The filter cake 4 consists of, for instance, a porous ceramic or metal mesh and its volume is about 0.8–2.0 liters. When the exhaust gases pass thorugh the filter 4, finely divided particles entrained in the exhaust gases are trapped over the surfaces of the filter cake 4 and then gradually grow in size so that the overgrown or oversize particles drop from the filter cake 4 and are entrained by the exhaust gases to the downstream.

The outlet 3b of the filter casing 3 is communicated with a cyclone trapper or separator 5, which is "an inertia type particle collection device" and traps the oversize particles. With the cyclone trapper or separator alone, it is impossible to trap the fine particles of less than one micron such as carbon particles contained in the exhaust gases from a diesel engine. However, according to the present invention, the filter cake 4 is disposed at the upstream of the cyclone trapper or separator 5 so that the carbon paticles of less than one micron grow to the particles of 0.1–1.0 mm and consequently the agglomerated or granulated particulates are easily trapped by the cyclone trapper or separator 5.

An electric heater 6 is disposed in a dust trap or receptacle 5a of the cyclone trapper or separator 5 and burns the particulates (substantially consisting of carbon particles) accumulated in the dust trap or receptacle 5a. Since the partcles start to burn at about 600° C., it is preferable to maintain the surface temperature of the heater 6 at about 700°–1000° C. The heater 6 is energized when a suitable amount of particles are accumulated in the dust trap or receptacle 5a. An amount of accumulated particles can be measured in terms of a traveled or driven distance of an automotive vehicle. That is, the quantity of exhausted particles is almost in proportion to the fuel consumption which in turn is almost in proportion to the driven distance. As a result, the amount of particles accumulated in the dust trap or receptacle 5a can be measured in terms of a driven distance. For instance, when one liter of fuel is consumed, about four grams of particles are exhausted while a vehicle travels about 12 kilometers. Therefore, about 0.33 grams of particles are exhausted per kilometer. If the collection efficiency of the cyclone trapper or separator 5 is 50%, about 0.16 grams of particles per kilometer are accumulated in the dust trap or receptacle 5a. Therefore, the heater 6 is energized everytime when the vehicle has driven a predetermined distance of, for instance, 50–100 kilometers so taht the collected particles are burned. To this end, the output from a trip measuring odometer (not shown) is transmitted on a line 8 to a control circuit 7 which in turn energizes the heater 6 for a predetermined time interval everytime when the vehicle has driven a predetermined distance of, for instance, 50–100 kilometers, Thus the collected particles are burned out. According to the prior art system, the whole temperature of a filter must be raised so as to burn the particles attached thereto so that a large quantity of heat is needed. However, according to the present invention, the heat generated by the heater 6 directly burns the collected particles so that the considerable heat economy can be attained as compared with the prior art system.

Figure 3:
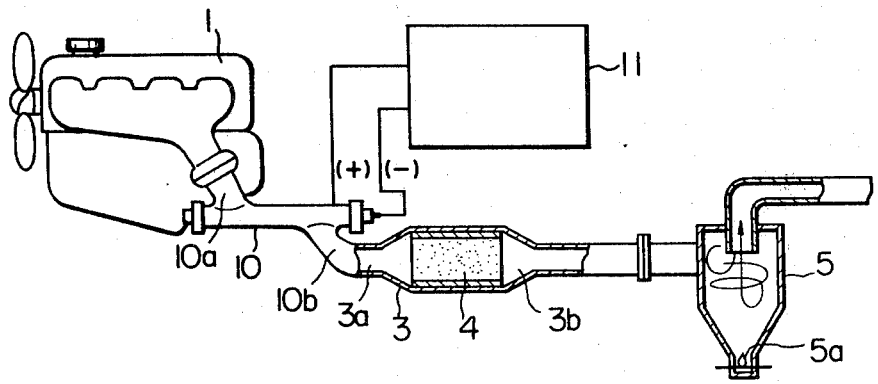
FIG. 3 is a side view, partly in section, of a second embodiment of the present invention.

Referring next to FIGS. 3 and 4, a second embodiment of the present invention will be described. A cylindrical metal casing 10 has an exhaust gas inlet 10a and an outlet 10b and a center electrode 12 cosisting of a fine metal wire is extended axially of the cylindrical casing 10 and supported at its end by insulators 13 and 14. The cylindrical casing 10 is about 40–100 mm in inner diameter and the center electrode 12 is about 0.2–2.0 mm in diameter. With a high DC voltage source 11, a high voltage of about 10–20 KV is applied between the cylindrical casing 10 and the center electrode 12 so that corona discharge occurs and is maintained in the vicinity of the center electrode 12 and consequently the particles contained in the exhaust gases are cahrged while they pass through the cylindrical casing 10. The discharge current is, in general, less than a few milliampers. Normally the center electrode 12 is negatively charged so that the dust particles are negatively charged. Mainly by virture of the Coulumb's force, the precipitation of the negatively charged particles to the filter cake 4 is much enhanced; that is, the collection efficiency can be considerably improved. In addition, the agglomeration of the negatively charged particles is intensified and consequently the particle size is increased. As a result, the trapping efficiency of the filter cake 4 is much enhanced.

The results of the experiments conducted by the inventors show that while the trapping or collection efficiency of a filter cake was about 30% when the dust particles were not charged, it was increased to about 70% when the particles were charged negatively. Only a small power consumption of about 10 watts is needed to maintain the desired corona discharge.

There is a fear that the dust particles mainly consisting of carbon particles are accumulated over the insulators 13 and 14 so that the insulation resistance thereof drops. According to the present invention, therefore, the insulators 13 and 14 are provided with cavities 13b and 14b, respectively, with air inlets 13a and 14a and outlets 13c and 14c, respectively. The fresh air is normally forced to flow from the inlets 13a and 14a through the cavities 13b and 14b and is discharged through the outlets 13c and 14c so that the adhesion of dust particles to the inner surfaces 13d and 14d of the cavities 13b and 14b is prevented and consequently the desired insulation resistance can be maintained. The fresh air can be supplied from an air pump which is driven by the diesel engine. The insulator 13 (at the left in FIG. 4) is provided with a spring 15 which serves to prevent the center electrode 12 from slacking. The center electrode 12 may be formed with a large number of small projections. Alternatively, a plurality of center electrodes may be extended.

Figure 6:
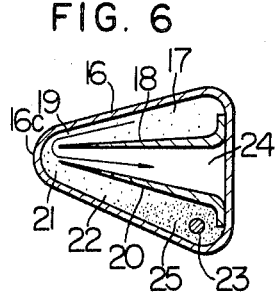
FIG. 6 is a cross sectional view thereof.

Referring next to FIGS. 5 and 6, a second example of an inertia type particle collector or separator in accordance with the present invention will be described. A pipe-shaped casing 16 has an exhaust-gas inlet 16a and an outlet 16b. A nozzle plate 18 is so disposed within the casing 16 as to define a slit-shaped nozzle 19 together with the wall of the casing 16. A space 17 defined between the casing 16 and the nozzle plate 18 has its one end communicated with the inlt 16a and the other end closed. Therefore, the exhaust gases flown into the space 17 is forced to be discharged in the form of a film through the nozzle 19 whose width is 1–3 mm. This film-shaped jet of exhaust gases discharged through the slit-like nozzle 19 impinges against an arcuately curved deflector-wall portion 16c of the casing 16 with a small radius of curvature so that the film-shaped jet is forced to sharply change its direction of flow so as to flow into the space 24 defined between the nozzle plate 18 and a particle-separation plate 20. One or downstream end of the space 24 is communicated with the outlet 16b while the other end thereof is completely closed. The free edge of the separation plate 20 is spaced apart from the inner wall of the casing 16 adjacent to the deflector-wall portion 16c so as to define a slit-like opening 21. A particle-collection or dust trap chamber 22 defined between the partition wall 20 and the casing 16 has its both upstream and downstream ends closed.

When the exhaust-gas jet issuing through the slit-like nozzle 19 impinges upon the deflector-wall portion 16c of the casing 16 and is forced to change its direction of flow sharpy almost about 180° the particles carried by the jet are subjected to a sudden high acceleration. As a result, by virtue of their greater inertia, they are forced to flow along the inner wall of the casing 16 into the dust trap chamber 22 through the opening 21.

A heater 23 consisting of a nichrome wire is extended in the dust trap chamber 22 and is energized when a suitable amount of particles are collected in the dust trap chamber 22, whereby the collected particles 25 are burned out. The particle trapper or collector is provided in an axially elongated form so that its mountability on an automotive vehicle is much improved as compared with a cyclone type dust collector or separator.

Figure 7:
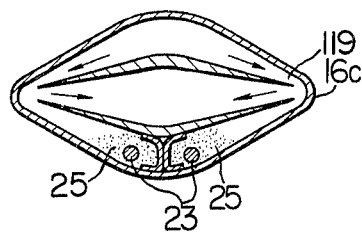
FIG. 7 is a cross sectional view of a third example of a particle separator in accordance with the present invention.

FIG. 7 shows in cross section a modification of the particle trapper or collector shown in FIGS. 5 and 6. The nozzle plate 18 and the particle separation plate 20 are so disposed that two slit-like nozzles 119 and penings 21 are provided symmetrical with the axis of the casing 16. In addition, two axially symmetrical dust trap chambers 22 are defined and provided with heaters 23, respectively.

Figure 8:
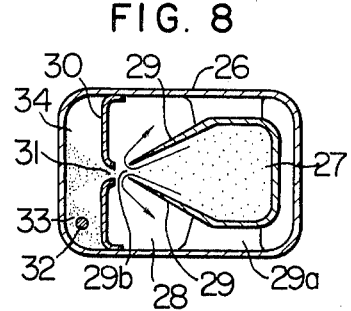
FIG. 8 is a cross sectional view of a fourth example of a particle separator in accordance with the present invention.

FIG. 8 shows in cross section a further example of an inertia type particle trapper or separator in accordance with the present invention. A casing 26 is in the form of a closed channel rectangular in cross section and has an exhaust gas inlet and an outlet. A nozzle plate 29 having a pear-shaped cross section is supported in the casing 26 by ribs 29a. On or upstream end of the interior 27 of the nozzle plate 29 is communicated with the inlet (not shown) of the casing 26 while the other or downstream end is closed. As a result, the exhaust gases flown in to the interior 27 is forcibly issued in the form of a film-like jet through a list-like nozzle 29b. Deflectors 30 are disposed adjacent to the nozzle 29b so that the exhaust-gas jet is deflected almost at right angles and divided into two flows as indicated by arrows. The free edges of the deflectors 30 are so spaced apart from each other by a suitable distance that a slit-like opening 31 is extended in parallel with and adjacent to the slit-like nozzle 29b. Therefore the particles entrained by the exhaust-gas issuing through the slit-like nozzle 29b are separated from the exhaust gases and flow through the opening 31 into a dust trap chamber 34 defined between the deflectors 30 and the casing 26. A heating element 32 is extended through the dust trap chamber 34 so that the collected particles 33 are burned out. A space 28 which is defined betwen the nozzle plate or structure 29 and the casing 26 has its upstream end closed and its downstream end communicated with the outlet (not shown) of the casing 26 so that the exhaust gases free from particles are discharged through the space 28 from the outlet.

Figure 9:
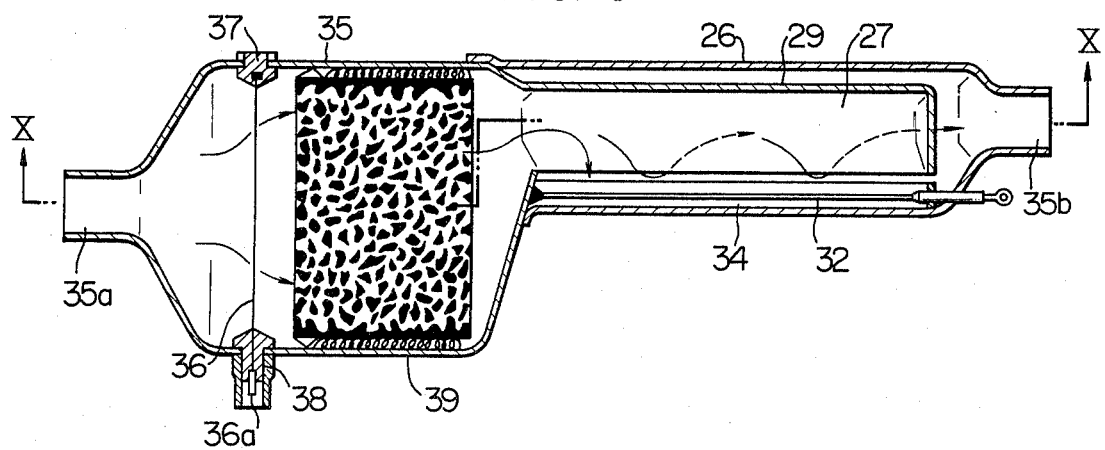
FIG. 9 is a horizontal sectional view of a third embodiment of the present invention.
Figure 10:
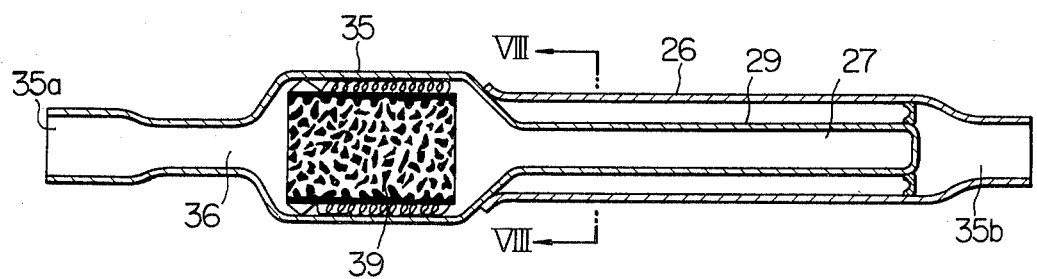
FIG. 10 is a sectional view taken along the line X—X of FIG. 9.

Next referring to FIGS. 9 and 10, a third embodiment of the present invention will be described. In this embodiment, a charging device, a filter cake and an inertia type particle trapper or separator are compactly disposed within a casing. FIG. 8 is a sectional view takne along the line VIII—VIII of FIG. 10. A casing generally indicated by the reference numeral 35 has an exhaust gas inlet 35a and an outlet 35b. A center electrode 36 is extended and has its both ends supported by insulators 37 and 38 which in turn are mounted on the casing 35. One end of the center electrode 36 is connected to a terminal 36a which in turn is connected to the negative terminal of a high DC voltage source (not shown) of 10–20 KV so that the corona discharge is maintained along the center electrode 36. As a result, the particles carried by the exhaust gases flowing into the casing 35 through its inlet 35a are negatively charged. Disposed at the downstream of the center electrode 36 is a filter cake 39 consisting of a porous ceramic shape or a metal mesh or fabric. The negatively charged particles are trapped over the surface of the filter cake 39 and agglomerated or granulated. The overgrown or oversize particles are carried again by the flow of exhaust gases from the surface of the filter cake 39 into the interior of the nozzle plate or structure 29 (See also FIG. 8). The oversize particles are trapped in the dust trap chamber 34 in the manner described previously with reference to FIG. 8. The collected particles are burned out by the heating element 32.

What is claimed is:

1. A carbon-particle decontaminating system characterized by comprising
  a filter cake which is heat-resistive and is disposed in an exhaust system of an internal combustion engine,
  an inertia type particle trapper or separator which is disposed at the downstream of said filter cake, and
  an electric heating means which is disposed in a dust particle trap chamber in said inertia type particle trapper or separator for burning the particles trapped therein.

2. A carbon-particle decontaminating system as set forth in claim 1 further characterized in that
  said inertia type particle trapper or separator comprises a slit-like nozzle through which the exhaust gases issue in the form of a film,
  deflector means which are adapted to abruptly change the direction of the flow of the exhaust-gas jet issued through said slit-like nozzle, and
  a slit-like opening which is so located that the outer edge of the exhaust-gas jet flows into said slit-like opening after the exhaust-gas jet has been changed its direction of flow by said deflector means.

3. A carbon-particle decontaminating system as set forth in claim 1 further characterized in that
  said inertia type particle trapper or separator comprises a slit-like nozzle through which the exhaust gases issue in the form of a film,
  deflector means which are adapted to abruptly change the direction of the flow of the exhaust-gas jet issued through said slit-like nozzle, and
  a slit-like opening which is defined between the free edges of said deflector means in parallel with and adjacent to said slit-like nozzle in opposed relationship therewith.

4. A carbon-particle decontaminating system as set forth in anyone of said claims 1–3, further comprising charging means disposed at the upstream of said filter cake, by which the particles contained in the exhaust gases are charged for improving the particle collection efficiency of said filter cake.

5. A carbon-particle decontaminating system as set forth in claim 4 further characterized in that said charging means comprises a casing having an exhaust gas inlet and an exhaust gas outlet, a center electrode consisting of a fine metal wire in said casing, insulators on said casing for supporting both ends of said center electrode, wherein cavities, air inlets and air outlets are provided for maintaining a DC voltage source.

* * * * *